(12) United States Patent
Hennig et al.

(10) Patent No.: US 8,739,589 B2
(45) Date of Patent: Jun. 3, 2014

(54) METHOD AND APPARATUS FOR SURFACE STRENGTHENING OF BLISK BLADES

(75) Inventors: Wolfgang Hennig, Simmern (DE); Goetz G. Feldmann, Oberursel (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 711 days.

(21) Appl. No.: 13/007,143

(22) Filed: Jan. 14, 2011

(65) Prior Publication Data

US 2011/0179844 A1  Jul. 28, 2011

(30) Foreign Application Priority Data

Jan. 27, 2010  (DE) .......................... 10 2010 001 287

(51) Int. Cl.
  *C21D 7/06* (2006.01)

(52) U.S. Cl.
  USPC ............................................. 72/53; 29/90.7

(58) Field of Classification Search
  USPC ................. 72/53; 29/90.7, 889.7; 451/39, 40
  See application file for complete search history.

(56) References Cited

U.S. PATENT DOCUMENTS

| | | | |
|---|---|---|---|
| 2,117,648 A | 5/1938 | Bottorf | |
| 2,439,032 A | 4/1948 | Almen | |
| 3,482,423 A * | 12/1969 | Smith et al. ........................ | 72/53 |
| 4,329,862 A | 5/1982 | Harburn et al. | |
| 4,426,867 A | 1/1984 | Neal et al. | |
| 4,454,740 A | 6/1984 | Neal et al. | |
| 4,616,496 A | 10/1986 | Hawkins | |
| 5,107,631 A | 4/1992 | Wern | |
| 5,314,545 A | 5/1994 | Folts et al. | |
| 5,476,363 A | 12/1995 | Freling et al. | |
| 5,596,912 A | 1/1997 | Laurence et al. | |
| 5,778,713 A | 7/1998 | Butler et al. | |
| 5,790,620 A * | 8/1998 | Okazaki et al. ............... | 376/305 |
| 5,885,133 A | 3/1999 | Williams, Jr. | |
| 5,948,293 A | 9/1999 | Somers et al. | |

(Continued)

FOREIGN PATENT DOCUMENTS

| | | |
|---|---|---|
| CA | 2368288 | 7/2002 |
| DE | 60100931 | 7/2004 |

(Continued)

OTHER PUBLICATIONS

German Search Report dated Apr. 30, 2010 from counterpart German patent application.

(Continued)

*Primary Examiner* — Edward Tolan
(74) *Attorney, Agent, or Firm* — Timothy J. Klima; Shuttleworth & Ingersoll, PLC

(57) ABSTRACT

For surface strengthening of blisk blades, a blade area of the blisk is completely inserted into a water bath (13), and a multitude of high-pressure water jets are injected into the water bath which are directed bilaterally and essentially vertically—and opposite to each other—to both blade sides. Cavitation bubbles imploding near the blade surface that are generated in the water bath on the periphery of the high-pressure water jets to produce micro jets upon imploding, exerting an effect on the blade surface, creating plastically formed depressions without sharp edges. An apparatus for performing the method includes a container (3), a jetting unit (6) having parallel spaced apart water-jet tubes (4) with nozzle openings connected to a high-pressure water conduit (5) to produce the high-pressure water jets.

14 Claims, 2 Drawing Sheets

(56) References Cited

U.S. PATENT DOCUMENTS

Figure 1:
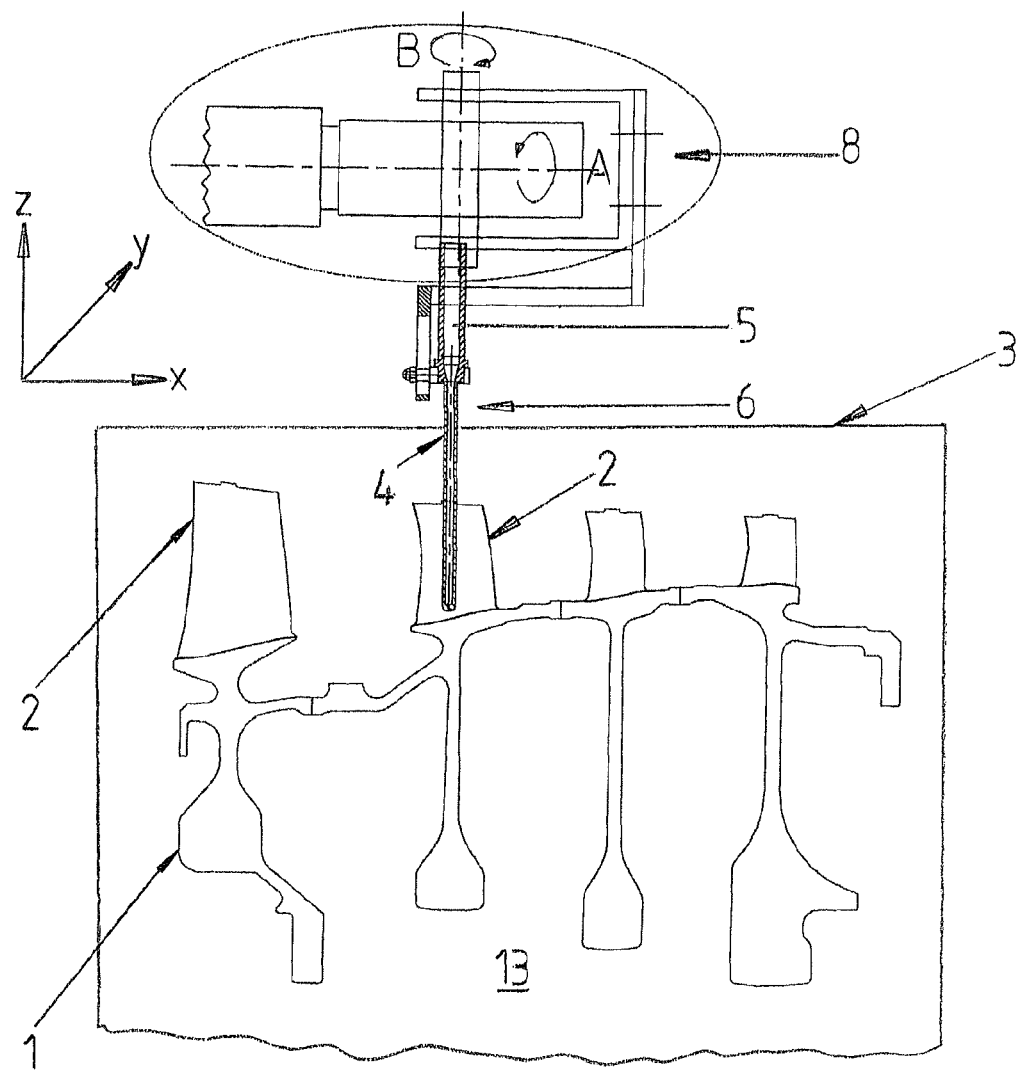

| | | |
|---|---|---|
| 5,988,188 A | 11/1999 | Born |
| 5,998,755 A | 12/1999 | Zajchowski et al. |
| 6,037,004 A | 3/2000 | Zajchowski et al. |
| 6,296,448 B1 | 10/2001 | Suh et al. |
| 6,490,899 B2 | 12/2002 | Berthelet et al. |
| 6,519,991 B2 * | 2/2003 | Hirano et al. ............ 72/53 |
| 6,541,733 B1 | 4/2003 | Mannava et al. |
| 6,551,064 B1 | 4/2003 | Mannava et al. |
| 6,694,789 B2 | 2/2004 | Yamamoto et al. |
| 6,938,448 B2 | 9/2005 | Kennerknecht et al. |
| 6,969,821 B2 | 11/2005 | Mika et al. |
| 6,993,948 B2 * | 2/2006 | Offer ..................... 72/53 |
| 7,028,378 B2 | 4/2006 | Cheppe et al. |
| 7,125,322 B1 | 10/2006 | Champaigne |
| 7,140,216 B2 | 11/2006 | Garza |
| 7,159,425 B2 | 1/2007 | Prevey et al. |
| 7,181,944 B2 | 2/2007 | Wuestefeld et al. |
| 7,217,102 B2 | 5/2007 | Rockstroh et al. |
| 7,582,174 B2 | 9/2009 | Vigneau |
| 7,647,800 B2 | 1/2010 | Cheppe et al. |
| 7,716,961 B2 * | 5/2010 | Hatou et al. ............ 72/53 |
| 7,784,181 B2 | 8/2010 | Nocciolini et al. |
| 8,256,117 B2 * | 9/2012 | Hennig ............... 29/889.7 |
| 2003/0024915 A1 | 2/2003 | Clauer et al. |
| 2004/0238509 A1 | 12/2004 | Clauer et al. |
| 2005/0103362 A1 | 5/2005 | Soyama |
| 2006/0174483 A1 | 8/2006 | Bayer et al. |
| 2008/0201947 A1 | 8/2008 | Richter et al. |
| 2009/0165519 A1 | 7/2009 | Berndt et al. |
| 2009/0235526 A1 | 9/2009 | Secherling et al. |
| 2010/0043512 A1 | 2/2010 | Bayer et al. |
| 2010/0125990 A1 | 5/2010 | Bayer et al. |
| 2010/0212157 A1 | 8/2010 | Hennig et al. |
| 2010/0221118 A1 | 9/2010 | Prevey, III |
| 2010/0287772 A1 | 11/2010 | Hennig et al. |

FOREIGN PATENT DOCUMENTS

| | | | | |
|---|---|---|---|---|
| EP | 0927773 | | 7/1999 | |
| EP | 1741796 | | 1/2007 | |
| EP | 2093021 | | 8/2009 | |
| GB | 615462 | | 1/1949 | |
| JP | 2000087897 | | 3/2000 | |
| JP | 2001252775 | | 9/2001 | |
| JP | 2002-346847 A | * | 12/2002 | ............ B23P 17/10 |
| JP | 2003013194 | | 1/2003 | |
| JP | 2003145357 | | 5/2003 | |
| JP | 2006058145 | | 3/2006 | |
| JP | 2006122846 | | 5/2006 | |
| JP | 2006-297569 A | * | 11/2006 | ............ B23P 17/10 |
| JP | 2008511783 | | 4/2008 | |
| WO | 02/10332 | | 2/2002 | |
| WO | 2005/065885 | | 7/2005 | |
| WO | 2006037698 | | 4/2006 | |
| WO | 2008063697 | | 5/2008 | |

OTHER PUBLICATIONS

European Search Report dated Apr. 27, 2011 from counterpart European patent application.

European Search Report dated Jun. 19, 2009 from related app No. 09150739.2.

German Search Report dated Jun. 26, 2008 from related app No. 10 2008 010 847.2.

* cited by examiner

METHOD AND APPARATUS FOR SURFACE STRENGTHENING OF BLISK BLADES

This application claims priority to German Patent Application DE102010001287.4 filed Jan. 27, 2010, the entirety of which is incorporated by reference herein.

This invention relates to a method for surface strengthening of blisk blades and to an apparatus for the performance of said method.

Under the aspects of reliability, weight saving, performance increase and service life, gas-turbine rotors, and in particular the rotors of the compressors of gas-turbine engines, are provided with a blading which is integrally formed on the outer periphery of a rotor disk. Such components are termed "blisks", with the term "blisk" being a shortened form of "blade integrated disk". As is generally known, blisks are manufactured by welding, in particular friction welding, separately manufactured blades to the peripheral annular surface of the preferably forged rotor disk or by a cutting or electro-chemical stock removal process starting at the outer annular surface of the disk. Upon forming and finish-machining of the blisk blades and following heat treatment of the entire blisk, or a blisk drum including several blisks joined together, application of force to the surfaces of the blisk blades produces plastic deformation and, thus, residual compressive stresses in the blade surface. The surface strengthening resulting therefrom enhances the resistance to vibration-induced crack formation and crack propagation as well as to wear and corrosion, increasing the service life of the blisk or the blisk drum. As is generally known, blisk blades are surface-treated by shot peening in which a spherical peening medium is impinged at high velocity on the blade surface using compressed air. The devices used in the process are, however, disadvantageous in that the stream of shot exiting from a nozzle opening, which may traverse the blade surface along a multitude of paths and vary in exit velocity and volume, is not capable of ensuring uniform strengthening of the entire surface. Furthermore, the plastic deformation of the blade surface resulting from shot peening entails a considerable change in surface topography, i.e. an increase of surface roughness. The increased surface roughness leads to adverse aerodynamic effects. While surface roughness is improvable by a subsequent polishing process, the complexity of the blisk geometry requires considerable effort and investment for the performance thereof. In addition, the effect of the precedent shot peening process is reduced as the previously strengthened surface layer is partly removed in the polishing process.

A broad aspect of the present invention is to provide a method and an apparatus for surface strengthening of blisk blades by which a uniformly distributed introduction of residual compressive stresses over the blade surface, and thus uniform strengthening, is ensured while avoiding an increase of surface roughness due to strengthening and the adverse effects resulting therefrom.

The present invention, in its essence, provides that the blisk blade to be treated is inserted into a water bath, either completely or at least the blade area to be processed, and that a multitude of high-pressure water jets is injected into the water bath which are directed bilaterally and essentially vertically—and opposite to each other—to both blade sides. In the water bath, cavitation bubbles imploding near the blade surface are generated on the periphery of the high-pressure water jets, thereby exerting on the blade surface a pressure pulse producing, unlike the shot peening effect, a plastically formed depression with rounded rim, i.e. one without sharp peripheral edge. Compared with shot peening, gentle strengthening of the surface with distinctly reduced surface roughness is obtained, in particular also in the intricate edge area of the blisk blades. Subsequent polishing operations are avoided, and surface strength is improved in that the characteristics of the strengthened surface are not affected by stock removal. Furthermore, processing of small fillet radii is ensured too.

According to the present invention, an apparatus for the performance of the method includes a container providing the water bath for receiving a blisk or blisk drum and a jetting unit composed of spacedly and parallelly arranged water-jet tubes connected to a high-pressure water conduit, with nozzle openings equidistantly disposed in longitudinal direction of the water-jet tubes to produce high-pressure water jets penetrating the water bath in the direction of the blade surface. The nozzle openings of the oppositely arranged water-jet tubes are directed towards each other and disposed immediately opposite to one another. The high-pressure water jet exits essentially vertically from the nozzle openings in the direction of the blade surfaces. Any other exit direction is however possible. The jetting unit is connected to a manipulator for moving the water-jet tubes at a distance from the blade surface which on both sides is uniform and follows the blade curvature.

In development of the present invention, the jetting unit on both sides includes at least one water-jet tube provided with a row of nozzle openings each. However, the both-side water-jet tubes can also feature a rectangular cross-section and be provided with at least one row of nozzle openings each. The length of the water-jet tubes, or a row of nozzle openings, corresponds to a part or at least the entire length of the blisk blade to be processed. The jetting unit is linearly moveable in X, Y and Z-directions and swivellable about a horizontal and a vertical axis by a manipulator.

The apparatus so designed enables the blisk blades to be strengthened completely and uniformly and with identical processing parameters.

Figure 2:
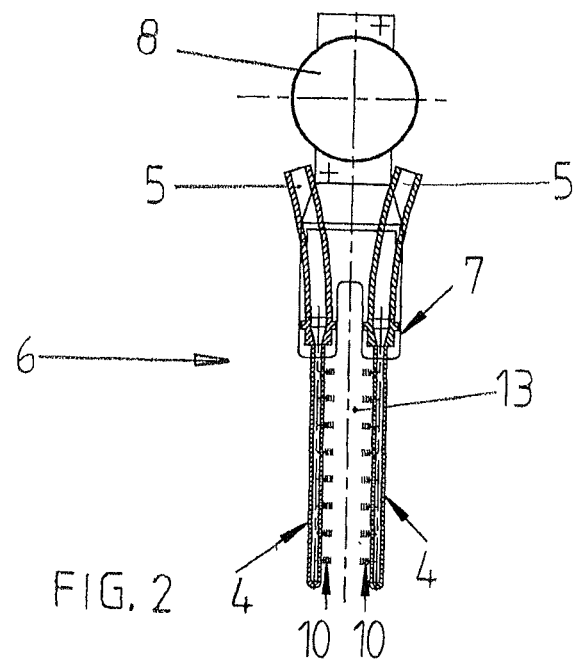
Figure 3:
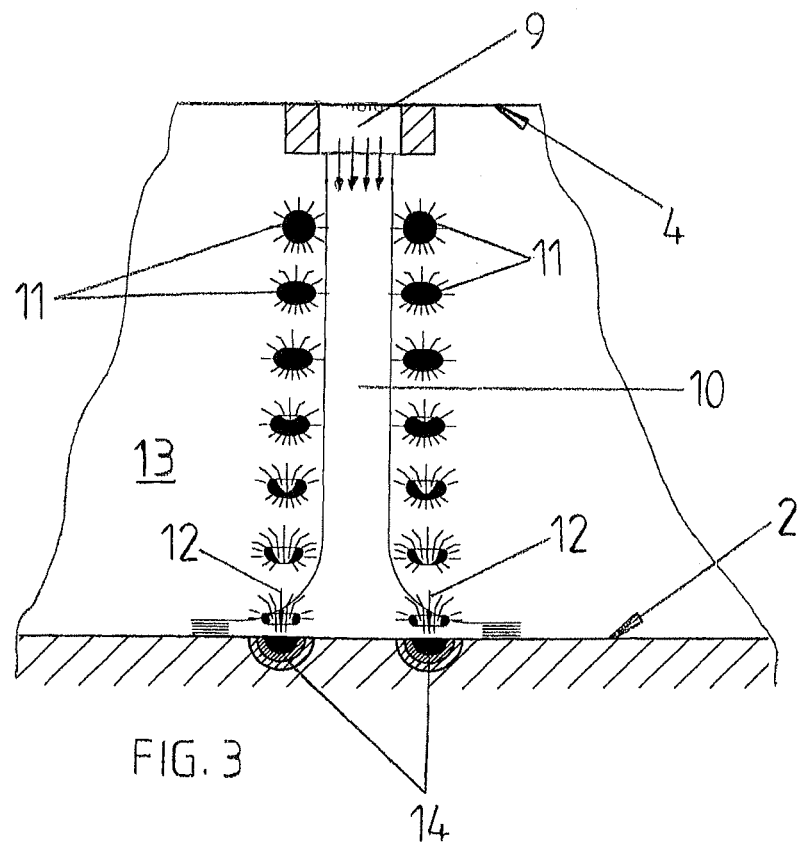

The present invention is more fully described in light of the accompanying drawings, showing a preferred embodiment. In the drawings, FIG. 1 is a front view of an apparatus for strengthening the surface of a blisk blade surrounded by a water bath, FIG. 2 is a side view of an apparatus in accordance with FIG. 1, however without the water container in which the blisk is inserted, and FIG. 3 is an enlarged representation of a high-pressure water jet directed onto the blade surface arranged in the water bath.

In FIG. 1, a blisk drum 1 with blisk blades 2 is shown in semi-sectional view. The blisk drum 1 is in a water-filled container 3, so that the blisk blades 2 are constantly surrounded by a water bath 13 during surface strengthening. Furthermore, the apparatus includes two water-jet tubes 4 parallelly and spacedly arranged relative to each other which are closed at the distal ends and whose opposite, open ends are each connected to a high-pressure water conduit 5. Via a retainer 7, the two water-jet tubes 4—which form a jetting unit 6—are firmly connected to a manipulator 8 permitting the jetting unit 6 to be traversed in X, Y and Z-directions and swiveled about a vertical and a horizontal axis as indicated by the arrows A and B. Nozzle openings 9 for generating a high-pressure water jet 10 emitting at high velocity are each equidistantly arranged in a row on the sides of the water-jet tubes 4 disposed opposite to one another. The nozzle openings 9 in the two water-jet tubes 4 are arranged such that the high-pressure water jets 10 exiting therefrom are precisely oriented towards each other to effect application of force to exactly opposite areas on the pressure side and the suction side of the blisk blade. The length of the water-jet tubes 4, or the jetting unit 6 formed by them, corresponds to at least the maximum height of the blisk blades 2 whose surface is to be strengthened, thereby enabling the entire blade surface to be covered and uniformly jetted with one or several paths of movement of the jetting unit.

During the strengthening treatment, the respective blisk blade 2 is arranged in the water bath 13 and between the two water-jet tubes 4 to which water under high-pressure, for example 350 bars, is supplied via the high-pressure water conduits 5 to generate the high-pressure water jets 10 exiting from the nozzle openings 9 towards the pressure side and the suction side of the blisk blade 2. According to the present exemplary embodiment, the diameter of the nozzle openings 9 or, respectively, the high-pressure water jets 10 is 1 mm. With the high-pressure water jets 10 entering at high velocity (v1) the static water bath 13 (velocity v0) in the container 3 and moving in the direction of the suction and pressure side of the blisk blade 2, cavitation bubbles 11 (vapor or gas bubbles, under-pressure bubbles) are—as schematically shown in FIG. 3—formed due to the static pressure decreasing in the process below the evaporation pressure of the water which, along the high-pressure water jet 10, gradually collapse with changing pressure and implode at or close to the surface of the blisk blade 2, thereby producing a micro jet 12 or pressure pulse acting upon the blade surface. During processing, the blisk blade 2 is located centrally between both water-jet tubes 4. The jetting unit 6 is moved at least once between the leading edge and the trailing edge of the blisk blade 2 by the manipulator 8 and follows the curvature of the blade surfaces by being swiveled by the manipulator 8. As the jetting unit 6 is moved, a multitude of micro jets 12 produced by imploding cavitation bubbles 11 impinges simultaneously and oppositely on the pressure and suction side of the blisk blade 2, there producing minute, plastically formed depressions 14 for surface strengthening. The depressions do not have peripheral sharp edges; rather, they have edges which are unsharp or rounded towards the blade surface. Plastic deformation is very uniformly and also very gently accomplished in one processing operation (without forming sharp edges at the rim of the depression and, thus, without substantially increasing surface roughness), so that a subsequent polishing operation, and an associated removal of stock, can be dispensed with.

The present invention is not limited to the above example. For example, the water-jet tubes 4 can also feature a rectangular cross-section and two or more rows of nozzle openings 4 arranged adjacently to each other. While water is the preferred liquid for use in the bath and water jets, other liquids can also be used.

List of Reference Numerals
1 Blisk drum
2 Blisk blade
3 Container
4 Water-jet tubes
5 High-pressure water conduit
6 Jetting unit
7 Retainer
8 Manipulator
9 Nozzle opening
10 High-pressure water jet
11 Cavitation bubbles
12 Micro jet (pressure pulse)
13 Water bath
14 Plastically formed depression

What is claimed is:

1. A method for surface strengthening of blisk blades, comprising:

providing a container at least partially filled with a liquid to provide a liquid bath for receiving a blisk blade;

inserting at least a portion of a blisk blade to be surface strengthened into the liquid bath;

providing a jetting unit having a pair of parallel spaced apart liquid jet tubes for positioning on opposite sides of the blisk blade, each connected to a supply of high-pressure liquid, each liquid jet tube having a plurality of nozzle openings equidistantly disposed along a longitudinal direction of the liquid jet tube to produce high-pressure liquid jets penetrating the liquid bath in a direction toward a surface of the blisk blade, the nozzle openings of each of the pair of liquid jet tubes being aligned with and directed toward counterpart nozzle openings on an other of the pair of liquid jet tubes;

inserting the jetting unit into the liquid bath with the each of the pair of liquid jet tubes positioned on opposite sides of the surface of the blisk blade and simultaneously injecting the high-pressure liquid jets from the liquid jet tubes into the liquid bath toward the opposite sides of the surface of the blisk blade to generate cavitation bubbles in the liquid bath on a periphery of the high-pressure fluid jets;

causing the cavitation bubbles to implode near the surface of the blisk blade to produce micro jets that create plastically formed depressions having rounded edges on the surface of the blisk blade; and providing a manipulator connected to the jetting unit for positioning each of the liquid jet tubes at an equal spacing from the opposite sides of the surface of the blisk blade, the manipulator controllable to traverse the jetting unit in X, Y and Z-directions and swivel about a vertical axis and a horizontal axis with respect to the blisk blade to cause the high-pressure liquid jets to traverse a curvature of the surface of the blisk blade while maintaining the equal spacing.

2. The method of claim 1, and further comprising positioning and simultaneously directing the high-pressure liquid jets on the opposite sides of the blisk blade toward the blisk blade at an angle essentially normal to an adjacent portion of the surface of the blisk blade.

3. The method of claim 2, wherein the liquid is water.

4. The method of claim 1, and further comprising positioning and simultaneously directing the high-pressure liquid jets on the opposite sides of the blisk blade toward the blisk blade at an oblique angle to an adjacent portion of the surface of the blisk blade.

5. The method of claim 4, wherein the liquid is water.

6. The method of claim 1, wherein the liquid is water.

7. The method of claim 6, and further comprising providing each of the liquid jet tubes has a rectangular cross-section and includes at least one row of nozzle openings.

8. The method of claim 6, and further comprising providing that a length of the plurality of nozzle openings corresponds to a length of a portion of the blisk blade to be strengthened.

9. The method of claim 1, and further comprising providing each of the liquid jet tubes has a rectangular cross-section and includes at least one row of nozzle openings.

10. The method of claim 1, and further comprising providing that a length of the plurality of nozzle openings corresponds to a length of a portion of the blisk blade to be strengthened.

11. The method of claim 2, and further comprising providing each of the liquid jet tubes has a rectangular cross-section and includes at least one row of nozzle openings.

12. The method of claim 2, and further comprising providing that a length of the plurality of nozzle openings corresponds to a length of a portion of the blisk blade to be strengthened.

13. The method of claim 4, and further comprising providing each of the liquid jet tubes has a rectangular cross-section and includes at least one row of nozzle openings.

14. The method of claim 4, and further comprising providing that a length of the plurality of nozzle openings corresponds to a length of a portion of the blisk blade to be strengthened.

\* \* \* \* \*